United States Patent [19]

Schiel

[11] Patent Number: 5,800,324
[45] Date of Patent: *Sep. 1, 1998

[54] ROLL WITH VIBRATION DAMPER

[75] Inventor: Christian Schiel, Heidenheim, Germany

[73] Assignee: Voith Sulzer Papiermaschinen GmbH, Heidenheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 661,050

[22] Filed: Jun. 10, 1996

[30] Foreign Application Priority Data

Jun. 10, 1995 [DE] Germany .................. 295 09 545 U

[51] Int. Cl.$^6$ ........................................ F16C 13/00
[52] U.S. Cl. .......................... 492/7; 492/4; 492/16
[58] Field of Search ...................... 492/4, 7, 16, 20; 162/358.1

[56] References Cited

U.S. PATENT DOCUMENTS

| | | | |
|---|---|---|---|
| 3,512,475 | 5/1970 | Justus et al. | 492/20 |
| 4,293,588 | 10/1981 | Biondetti | 29/116 |
| 4,514,887 | 5/1985 | Rauf et al. | |
| 4,858,292 | 8/1989 | Bühlmann et al. | |
| 5,382,096 | 1/1995 | Stein et al. | 384/116 |

FOREIGN PATENT DOCUMENTS

| | | |
|---|---|---|
| 2920528 | 3/1981 | Germany . |
| 8629880 | 12/1989 | Germany . |
| 0330657 | 10/1991 | Germany . |
| 3710724 | 7/1994 | Germany . |
| 4318035 | 12/1994 | Germany . |
| 4319579 | 12/1994 | Germany . |

*Primary Examiner*—Irene Cuda
*Attorney, Agent, or Firm*—Ostrolenk, Faber, Gerb & Soffen, LLP

[57] ABSTRACT

A roll, as in a paper making machine press section, with vibration damping, wherein the roll includes a stationary central shaft, a rotatable annular, roll shell, a plurality of hydraulic pressure chambers each with a shoe hydraulically supported therein and pressed against the interior of the annular roll shell, wherein the roll shell is subject to vibration, which vibrates the support elements. A hydraulic pressure liquid feed channel extends through the stationary shaft and communicates with each pressure chamber. A respective throttle in the form of a channel either between the feed channel and each of the pressure chambers, or one throttle channel communicating with several of the pressure chambers or a throttle channel communicating into the feed channel from the source of pressure fluid. The cross section of flow through the throttle channel is selected according to a formula, typically wherein the product $d^2 \times n^{-1}$ is between 6 mm$^2$ and 90 mm$^2$ where d is the cross section of a throttle channel and n is the number of pressure chambers supplied by the respective throttle.

24 Claims, 3 Drawing Sheets

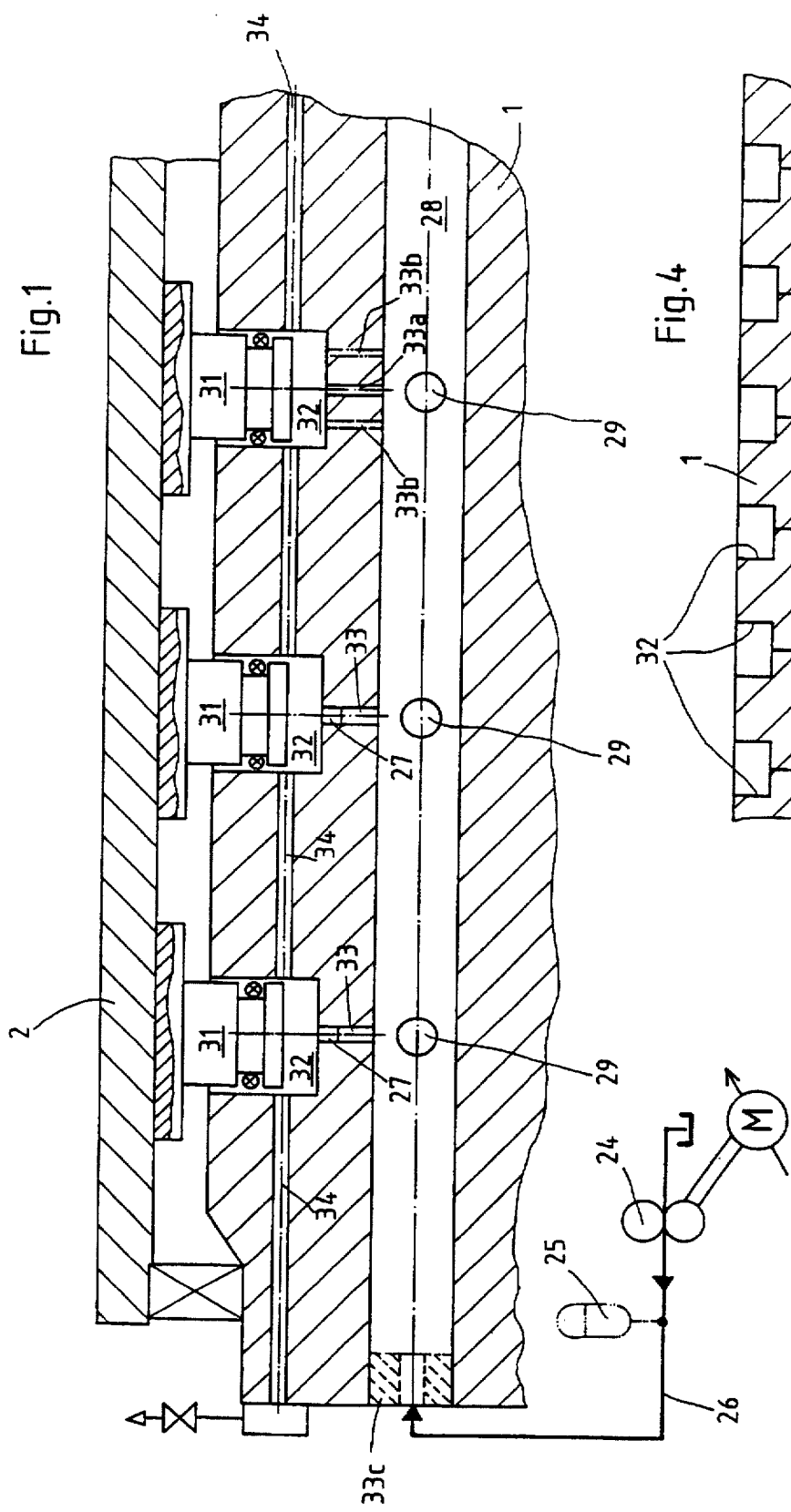

ROLL WITH VIBRATION DAMPER

BACKGROUND OF THE INVENTION

The present invention relates to a roll with vibration damper, particularly for producing or handling fiber webs, for instance paper or board webs. For example, the roll may be used as one roll in a press nip in a paper machine press section.

The present roll is an improvement over a roll known from EP 0 330 657, FIG. 6, which corresponds to U.S. Pat. No. 5,081,759, and also improves upon the roll in German Utility Model Application 295 08 422.7, filed May 20, 1995, corresponding to U.S. application Ser. No. 650,803, filed May 20, 1996.

This roll has a stationary central shaft and a roll shell which rotates about the central shaft. Within the central shaft there are a number of, for instance, cylindrically shaped pressure chambers which extend in a radial direction and are all in one press plane (the plane in which pressure is applied). Each pressure chamber receives a radially displaceable support element in it. Each pressure chamber can be filled with a pressure fluid which transmits a hydraulic supporting force from the central shaft via the support element to the shell of the roll. Instead of several pressure chambers each of which has a support element, a single long pressure chamber having a single long support element can be provided.

A feed channel provided in the stationary central shaft, for instance at its center, feeds the pressure fluid into the pressure chambers. The feed channel is connected in each case by a constricted line (for instance by a throttle channel) to each of the pressure chambers. For damping possible vibrations of the roll shell with reference to the central shaft, at least one length of hose having closed ends and which is filled with a gas is provided in the feed channel. This provides a compressible gas bubble in the feed channel, establishing equilibrium between the pressure of the pressure fluid and the pressure of the gas contained in the length of hose.

Instead of the gas filled length of hose, a mechanical structural part can also be provided, which is deformable under the pressure of the pressure fluid. See German Utility Model Application 295 08 422.7, filed May 20, 1995, corresponding to U.S. application Ser. No. 650,803, filed May 20, 1996. In that case, equilibrium is established in operation between the pressure of the pressure fluid and an opposing force which results from the deformation of a resilient mechanical structural part which act applies pressure on the fluid. In both cases, the feed channel can be merely partially filled with fluid. Therefore, the volume of the feed channel which can be filled with fluid can change. This known device operates as follows:

When the roll shell carries out a swinging movement or vibration in the radial direction for any reason, periodic changes in volume of the pressure chambers and thus also periodic changes in the pressure of the fluid present in the pressure chambers result. This causes an exchange of fluid via the throttle channels between the pressure chambers and the feed channel. If the throttle channels are properly dimensioned, there is a noticeable damping of the vibrations of the shell of the roll. A certain damping of the vibrations is also possible if the resilient pressure applying elements described above are replaced by a hydraulic accumulator for the pressure fluid located outside the roll and connected to the feed channel. This accumulator is a fluid container with a compressed air cushion. The same purpose can also be served if the feed channel in the central shaft for the pressure fluid has a relatively large volume and/or if a relatively rapidly operating pressure control valve is connected to the central channel. All of these measures act so that the volume of fluid present between the source of pressure fluid and the throttle channel is variable according to variations in pressure caused by vibrations of the roll shell.

Whether vibrations of the roll shell which possibly occur are now sufficient depends substantially on the proper dimensioning of the throttle channel or channels. There is a constant problem of insufficiently effective vibration damping systems and this in turn constantly leads to difficulties in, for instance, paper manufacturing machines. The quality of the paper webs produced can suffer, or the vibrations may lead to premature wear of parts of the roll or of other adjacent machine parts.

SUMMARY OF THE INVENTION

The object of the present invention is to so develop the known roll with a vibration damper that any vibrations of the roll shell can be eliminated or at least dampened with a higher degree of dependability than was previously possible.

The present invention concerns the dimensions and cross sections or diameters of the throttle channels, and in various embodiments, it concerns either the diameter or cross-section, sometimes in association with the length of the channel, and with reference to the number of support elements for the roll shell which are associated with and receive their pressure fluid through a throttle channel.

The invention concerns a roll having a vibration damper used in the manufacture and handling of a fiber web, particularly a paper or board web, e.g., press roll, which cooperates with a counter roll to define a roll pair with a press nip between them. The roll has a stationary central shaft and an annular roll shell rotatably supported around the shaft.

A feed channel, preferably centrally in the shaft, carries hydraulic pressure fluid in the shaft. The feed channel is connected to a source of liquid pressure, like a pump, and therefore is part of the source of liquid pressure to below described pressure chambers. There are at least one and more usually a plurality of pressure chambers extending radially out from the feed channel toward the periphery of the shaft and generally in the plane of pressure applied to the roll. A radially displaceable support element is disposed in each of the pressure chambers and is operable to press on the interior of the roll shell. Preferably, that displaceable support element comprises a piston with a shoe on its outer end for engaging the interior of the roll shell.

The connection from the fluid pressure source, and usually from the feed channel through the shaft, to the or each of the pressure chambers is through one or more liquid throttles, in the form of throttling channels defined in the central shaft. The fluid pressure between a pressure source communicating with a feed channel and the throttle channel is variable as the rotatable shell may vibrate.

The invention concerns an improvement in control over roll shell vibration through dimensioning of the throttle channel or throttle channels communicating with the pressure chambers. Several embodiments of throttle arrangements are disclosed here, and others may be apparent to ones skilled in the art. A first embodiment includes a respective throttle channel communicating between the feed channel and each pressure chamber. Each pressure chamber pressure supports a respective hydraulically pressurized hydraulic support element which acts on the interior of the roll shell.

A second embodiment includes a respective throttle channel or pathway communicating from the feed channel to more than one, but less than all, of the pressure chambers. A third embodiment comprises a single throttle to all of the pressure chambers. A fourth embodiment concerns a throttled communication to the feed channel in the shaft, which supplies all of the pressure chambers. In a variation of any of the above, a plurality of throttles may communicate from the feed channel to one pressure chamber. These and other variations of throttled communications between the pressure source, on the one hand, and the pressure chambers, on the other hand, are the subjects of the invention. The invention particularly concerns the dimensioning of the throttle channels depending upon how many of the pressure chambers communicate with one throttle channel and particularly the area of the cross section of the throttle channel, i.e., whether it has a uniform cross section or its cross section varies over the length of the channel, respectively either widening in the direction from the feed channel to the pressure chamber or narrowing and tapering in that direction. The invention includes various formulae for selecting appropriate dimensioning of throttle channels for particular arrangements.

The invention is applicable both with hydrodynamically lubricated slide surfaces between the pistons (or slide shoes) and the roll shell (in accordance with EP 0 330 657, FIG. 6) and with hydrostatic bearing pockets (in accordance with Federal Republic of Germany 38 02 234 which corresponds to U.S. Pat. No. 4,858,292). It can also be employed for only a single support element which extends over the length of the roll (U.S. Pat. No. 3,276,102).

Other features and advantages of the present invention will become apparent from the following description of the invention which refers to the accompanying drawings.

BRIEF DESCRIPTION OF THE DRAWINGS

FIG. 1 is a partial longitudinal section through a roll with vibration damper.

FIG. 4 shows an alternative to FIG. 1.

DETAILED DESCRIPTION OF PREFERRED EMBODIMENTS

Figure 2:
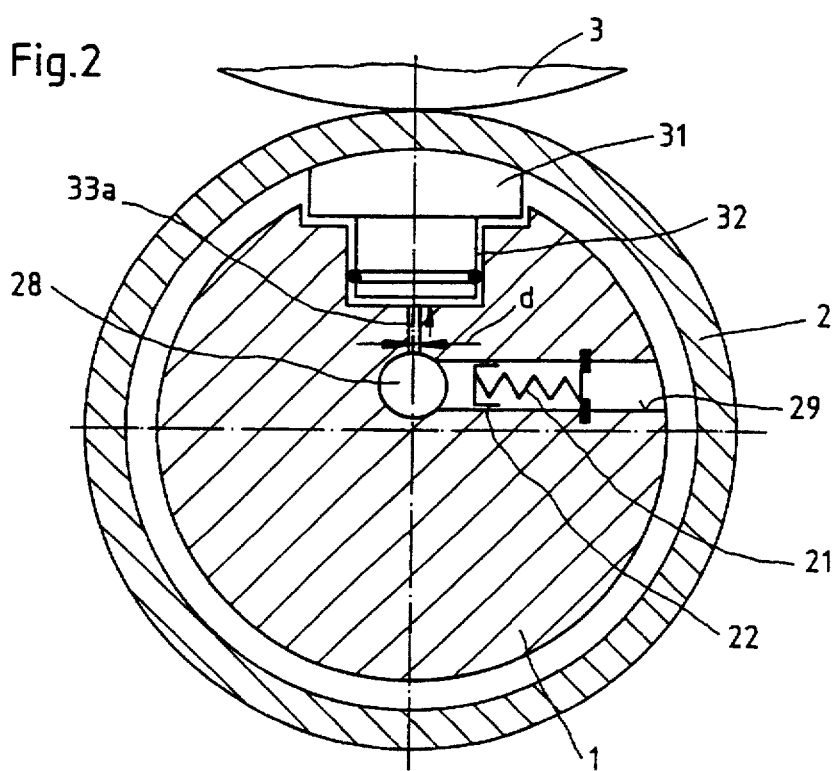
FIG. 2 is a cross section through FIG. 1.

The roll shown in FIGS. 1 and 2 has a stationary central shaft 1 and an annular roll shell 2 which rotates around the central shaft. The shell is mounted in a known matter at its two ends, for instance on the stationary central shaft 1. A feed channel 28 for pressure fluid extends in the longitudinal direction through the center of the central shaft 1.

Hydraulic pressure fluid passes, via several radial holes 33 in the shaft, into several cylindrical chambers or pressure chambers 32 arranged in a row along the shaft in one plane, typically the press plane against the pressure applied to the roll. Within each cylindrical chamber 32 there is a support element 31, which is, for instance, in the form of a piston. The piston is displaceable in the radial direction. It has a slide shoe on its radially outer end. The slide shoe has a convexly curved slide surface which is adapted to the shape of the interior of the annular roll shell 2. The presence of elevated pressure in the cylindrical chambers 32 presses the support elements 31 against the inner surface of the roll shell 2. In this way, the roll shell 2 is pressed against a backing roll 3 and the chambers 32 are positioned to counter the pressure of roll 3. The pressure of the roll 3 would cause a controlled sagging of the roll shell 2. For instance, the sag may be maintained at a zero value by establishing a given pressure in the cylindrical chambers 32.

There is a vent line 34. Since a small portion of the pressure fluid escapes as leakage fluid at the seals, a slipstream of pressure fluid into the pressure chambers 32 takes place continuously through the holes 33.

The following provision is made in order to dampen any radial direction vibrations of the roll shell 2. A throttle channel, for instance in the form of a small bushing 27, can be arranged in each of the radial holes 33 (FIG. 1). However, it is preferable to develop the radial hole itself as a throttle channel, as indicated at 33a. A single throttle channel 33a can be associated with each pressure chamber 32.

In the embodiment of FIG. 1, either throttle channels in respective bushings 27 or a throttle channel 33a may be provided. However the throttle channel may be formed, this embodiment achieves vibration damping. Since the cross section or diameter of the throttle channel to each of the pressure chambers is known, and since that cross section remains constant along the length of the throttle channel, and since there is a respective throttle channel or throttle communicating with each of the pressure chambers 32, then the cross section of each of the throttle channels is selected to be related to the number of the pressure chambers 32 and their support elements 31 that are served by an individual throttle channel where the diameter, or if not circular, the cross section, "d" of each throttle is related to the quantity "n" of pressure chambers served by the one throttle, such that $d^2 \times n^{-1}$ is between 6 mm$^2$ and 90 mm$^2$. In particular, where only one pressure chamber is served by a single throttle or throttle channel of constant cross section, as shown in FIGS. 1 and 2, the cross section of the channel is simply $d^2$.

However, as many additional throttle channels 33b as desired can also be provided for each chamber 32, as shown toward the right in FIG. 1. The pressure chamber 32 to the right in FIG. 1 is served by not one, but three, throttle channels 33a and 33b. Where there are a plurality of throttles serving a single pressure chamber, n equals 1 divided by the number of throttles serving the particular chamber. In the case of the throttle channels 33a, 33b, for one pressure chamber and one support element 31, with three throttle channels connected in parallel, n equals ⅓.

Another possible alternative is indicated at the left at 33c in FIG. 1. Here a common throttle is provided for all pressure chambers 32. It is arranged, for instance, at the beginning of the feed channel 28 which passes through the central shaft 1. In this case, the bushings 27 can be dispensed with or the throttle channels 33a/33b can be replaced with respective normal holes 33. In the embodiment where there is a common throttle 33c for all of the pressure chambers, in a typical roll of the type illustrated, there may, for instance, be eleven of the pressure chambers 32 all supplied out of the feed channel 28. Therefore, for the throttle 33c which is at the entry mouth of the feed channel 28 into the central shaft 1, the above noted formula is used where n equals 11.

FIG. 4 shows a variant in which each throttle channel 33d is associated with a group, for instance, of three pressure chambers 32. In FIG. 4, the cross sections of the throttles are substantially constant and do not change in the flow direction. In the embodiment of FIG. 4, n equals 3, whereas in the embodiment of FIG. 1, n had equalled 1. The cross sections of the throttle should be selected according to the formula above.

The central shaft 1 has several transverse holes 29 which connect the feed channel 28 with the annular space present between the roll shell 2 and the central shaft 1. Normal atmospheric pressure is ordinarily present in this annular space since the annular space is connected at its ends to the ambient atmosphere by lines, not shown.

In the event of possible vibrations of the roll shell, the volume of the feed channel 28 which is filled with pressure fluid can change rapidly and unimpeded. In FIG. 2, the volume of the feed channel 28 is limited by a piston 22 which is arranged in the transverse hole 29. A compression spring 21 urges this piston against the fluid pressure.

Figure 3:
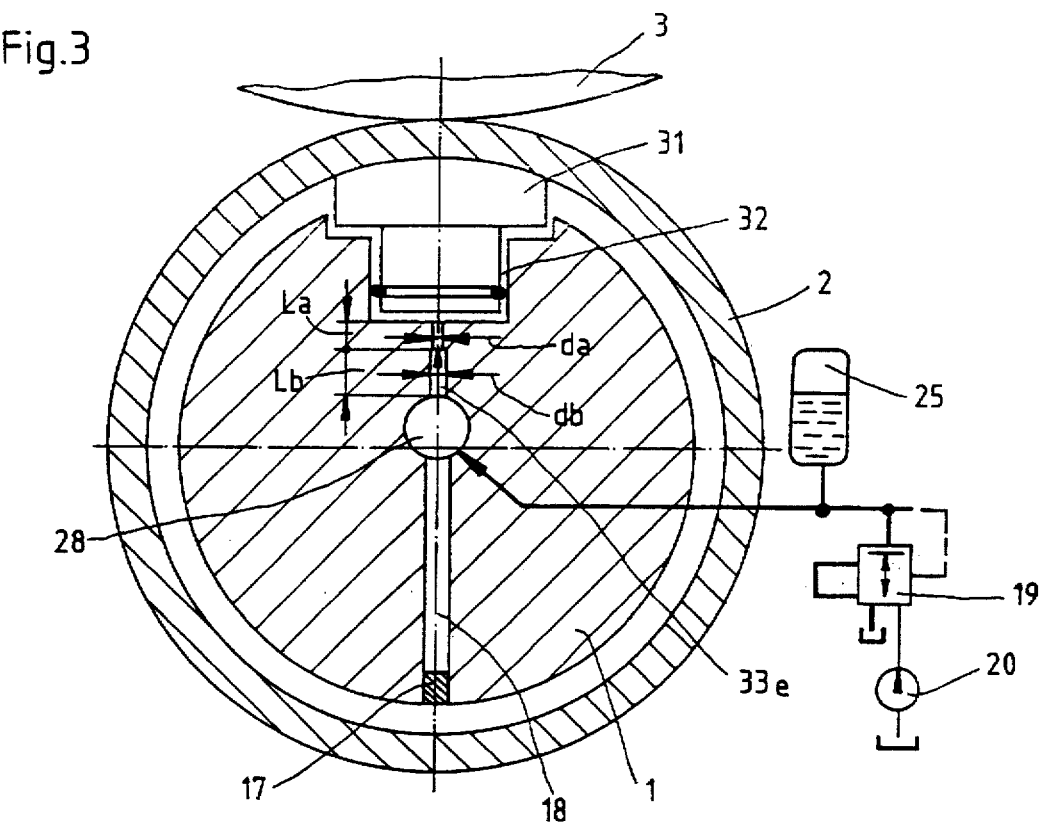
FIGS. 3, 5 and 5a each show an alternative to FIG. 2.

Instead of the device 21, 22, 29, a hydraulic accumulator 25 for pressure fluid can be provided, on the outer feed line, as shown in FIG. 1. A gear pump 24 is used as the source of pressure. The pressure produced by that pump is variable in the manner that the speed of rotation of the drive motor M is adjusted. An alternative shown in FIG. 3 is an arrangement which is generally used comprising a pump 20 and pressure regulating valve 19. This arrangement and the hydraulic accumulator 25 are disclosed in Federal Republic of Germany 31 51 001 C2. which corresponds to U.S. Pat. No. 4,514,887.

The throttle channel 33a shown in FIG. 2 has a constant cross section in the direction of flow. It is produced by drilling the central shaft 1. This avoids the danger that a channel developed as a separate structural part might become loose during operation.

In FIG. 3a throttle channel 33e has a cross section of flow which tapers down in the direction of flow out to the chamber 32, for instance stepwise tapering. To produce such a narrowing throttle channel 33e by drilling, an auxiliary hole 18 is first produced in the shaft 1, starting from the opposite side. That hole is subsequently closed by a plug 17. The throttle channel 33e is divided, for instance, into two channel sections having respective diameters da and db and lengths La and Lb. Where the cross section of flow of the throttle channel changes stepwise in the direction of flow, so that it has at least two successive channel sections of descending diameter and of respective lengths, wherein the diameter db nearer to the feed channel 28 provides a larger cross section db while the smaller diameter da produces a smaller cross section da further from the feed channel, the length and cross sections of the throttling channels should be selected so that the sum of the factors $da^4/La \times n^{1/4} + db^4 \times n^{1/4} + \ldots$ is between 1 and 50 mm$^3$ and preferably between 2 and 25 mm$^3$.

Figure 5:
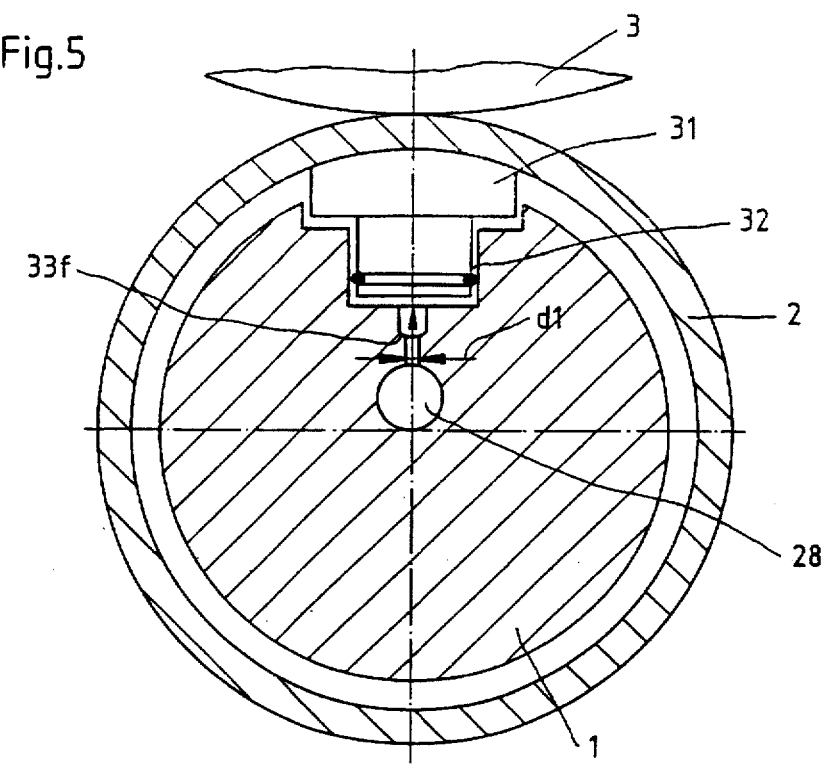
Figure 5A:
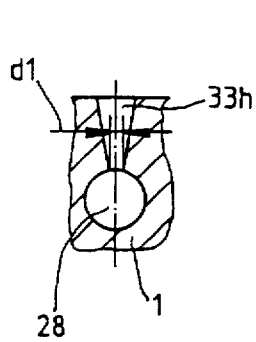

FIGS. 5 and 5a show respective further variants comprising a throttle channel 33f which widens stepwise in the direction of flow out to the chamber 32, and a continuously widening throttle channel 33h. Where the cross section of the throttle channel varies continuously in the direction of flow, preferably in the form of widening of its cross section away from the feed channel, for the smallest cross-section or diameter d1 of the throttle channel, the product $d1^2 \times n^{-1}$ is greater than 6 mm$^2$.

Figure 6:
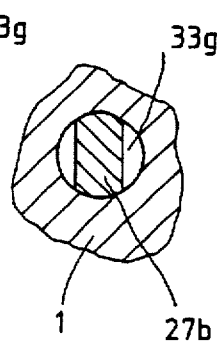
FIGS. 6 to 8 show different cross sectional shapes for a throttle channel.
Figure 7:
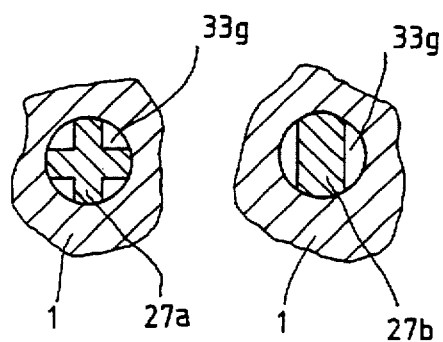
Figure 8:
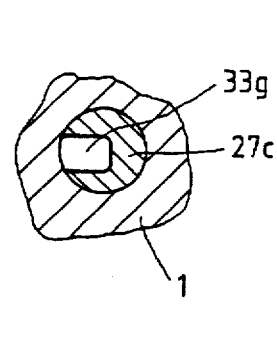

FIGS. 6–8 show variant embodiments with a different concept. In each, a respective filler piece 27a, 27b, 27c of other than pipe-like or tubular cross sectional shape is inserted in a radial hole 33g, which has a relatively large diameter for simplifying manufacture.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roll with vibration damping for use in manufacturing a fiber web, the roll comprising:

a non-rotating central shaft;

a rotatable, annular roll shell around the shaft and supported for rotation around the central shaft, the roll shell having an interior, the roll shell being capable of vibration with respect to the central shaft;

at least one pressure chamber in the shaft extending radially toward the roll shell and communicating with a source of liquid under pressure;

a support element in the pressure chamber engageable with the interior of the roll shell for supporting the roll shell against pressure applied thereto and being moved by vibration of the roll shell, the pressure chamber being acted upon by a pressure liquid for transmitting a hydraulic supporting force from the source of liquid under pressure via the support element to the roll shell, the support element substantially preventing communication of the liquid under pressure with the interior of the roll shell; and at least one throttle between the source of liquid under pressure and at least one of the pressure chambers.

2. The roll of claim 1, wherein the throttle is a channel having a length and the channel is of constant cross section "d" over its length, and the number of pressure chambers having a respective one of the throttles communicating with these pressure chambers is indicated by the number "n", and the product of $d^2 \times n^{-1}$ is in the range between 6 mm$^2$ and 90 mm$^2$.

3. The roll of claim 1, wherein there is a respective throttle at and for each of a plurality of the pressure chambers.

4. The roll of claim 3, wherein the respective throttles to each of the plurality of pressure chambers are disposed in the shaft between the source of liquid under pressure and each of the respective pressure chambers.

5. The roll of claim 1, wherein each of the throttles comprises a channel in the shaft having a cross section that varies continuously in the flow path through the channel between a smaller and a larger cross section.

6. The roll of claim 5, wherein the throttle channel is continuously widening in cross section in the direction toward the pressure chamber.

7. The roll of claim 5, wherein the source of liquid under pressure comprises a feed channel through the shaft for containing the pressurized liquid and a source of pressure to the feed channel.

8. The roll of claim 7, wherein the at least one throttle channel is disposed between the feed channel and the respective pressure chamber.

9. The roll of claim 1, wherein each throttle comprises a respective channel in the shaft, and the cross section of the channel changes stepwise in the direction of flow, therefore comprising at least two successive channels of respective lengths La, Lb having respective cross sections of da, db, wherein the sum of the factors $da^4/La \times n^{1/4} + db^4 \times n^{1/4} + \ldots$ is between 1 and 50 mm$^3$.

10. The roll of claim 9, wherein the sum of the factors is between 2 and 25 mm$^3$.

11. The roll of claim 1, wherein a plurality of individual throttles are connected in parallel between the source of liquid under pressure and at least one of the pressure chambers, and for each of the pressure chambers having a plurality of throttles connected thereto, the factor n is divided by the number of throttles communicating with that pressure chamber.

12. The roll of claim 1, wherein the source of liquid under pressure comprises a feed channel through the shaft for containing the pressurized liquid and a source of pressure to the feed channel.

13. The roll of claim 12, wherein the at least one throttle channel extends radially through the central shaft between the feed channel which extends longitudinally through the shaft and the respective pressure chamber.

14. The roll of claim 13, wherein the at least one throttle channel extends radially through the shaft from one side of the shaft through the feed channel and to the pressure chamber.

15. The roll of claim 12, wherein there are a plurality of throttles each comprising a channel in the central shaft, a plurality of the pressure chambers in the shaft with which respective ones of the throttle channels communicate, the throttle channels being worked directly into the central shaft without additional elements forming the throttle channels.

16. The roll of claim 15, wherein the cross section for flow of each of the throttle channels narrows in the direction of flow.

17. The roll of claim 1, wherein the at least one throttle channel comprises a hole in the central shaft and a non-pipe shaped filling piece within the hole to define the channel.

18. The roll of claim 1, wherein the at least one throttle has a cross section "d" and the number of pressure chambers having a respective one of the throttles communicating with these pressure chambers is indicated by a number "n", so that the product of $d^2 \times n^{-1}$ is at least 6 mm$^2$.

19. The roll of claim 5, wherein the number of pressure chambers having a respective one of the throttles communicating with the pressure chambers is indicated by a number "n", and wherein for a smallest cross section "d" of the throttle channel, the product $d^2 \times n^{-1}$ is at least 6 mm$^2$.

20. A roll with vibration damping for use in manufacturing a fiber web, the roll comprising:

a non-rotating central shaft;

a rotatable, annular roll shell around the shaft and supported for rotation around the central shaft, the roll shell having an interior, the roll shell being capable of vibration with respect to the central shaft;

at least one pressure chamber in the shaft extending radially toward the roll shell and communicating with a source of liquid under pressure;

a support element in the pressure chamber engageable with the interior of the roll shell for supporting the roll shell against pressure applied thereto and being moved by vibration of the roll shell, the pressure chamber being acted upon by a pressure liquid for transmitting a hydraulic supporting force from the source of liquid under pressure via the support element to the roll shell; and at least one throttle channel between the source of liquid under pressure and the at least one pressure chamber, the at least one throttle channel being worked directly into the central shaft without additional elements forming the throttle channel.

21. A roll with vibration damping for use in manufacturing a fiber web, the roll comprising:

a non-rotating central shaft;

a rotatable, annular roll shell around the shaft and supported for rotation around the central shaft, the roll shell having an interior, the roll shell being capable of vibration with respect to the central shaft;

a plurality of pressure chambers in the shaft extending radially toward the roll shell and communicating with a source of liquid under pressure;

a support element in the pressure chamber engageable with the interior of the roll shell for supporting the roll shell against pressure applied thereto and being moved by vibration of the roll shell, the pressure chamber being acted upon by a pressure liquid for transmitting a hydraulic supporting force from the source of liquid under pressure via the support element to the roll shell; and a throttle in common between the source of liquid under pressure and serving at least two of the plurality of pressure chambers.

22. A roll with vibration damping for use in manufacturing a fiber web, the roll comprising:

a non-rotating central shaft;

a rotatable, annular roll shell around the shaft and supported for rotation around the central shaft, the roll shell having an interior, the roll shell being capable of vibration with respect to the central shaft;

at least one pressure chamber in the shaft extending radially toward the roll shell and communicating with a source of liquid under pressure;

a support element in the pressure chamber engageable with the interior of the roll shell for supporting the roll shell against pressure applied thereto and being moved by vibration of the roll shell, the pressure chamber being acted upon by a pressure liquid for transmitting a hydraulic supporting force from the source of liquid under pressure via the support element to the roll shell;

a feed channel communicating with the at least one pressure chamber; and at least one throttle between the source of liquid under pressure and the feed channel.

23. The roll of claim 22, wherein the feed channel extends longitudinally through the shaft and communicates with each of the pressure chambers.

24. The roll of claim 23, wherein the throttle is disposed at an entry mouth of the feed channel into the shaft.

* * * * *